United States Patent [19]
Wilkins

[11] Patent Number: 5,205,311
[45] Date of Patent: Apr. 27, 1993

[54] COMPOUND LEVER CONTROLLED SPILL VALVE

[75] Inventor: Larry C. Wilkins, New Albany, Ind.

[73] Assignee: Electromechanical Research Laboratories, Inc., New Albany, Ind.

[21] Appl. No.: 846,855

[22] Filed: Mar. 6, 1992

[51] Int. Cl.⁵ .............................................. F16K 17/12
[52] U.S. Cl. .................................. 137/14; 137/527.8; 137/531
[58] Field of Search .................. 137/527.8, 531, 14

[56] References Cited

U.S. PATENT DOCUMENTS

| | | | |
|---|---|---|---|
| 46,238 | 2/1865 | Hudson | 137/531 X |
| 64,070 | 4/1867 | Burridge | 137/531 |
| 1,725,428 | 8/1929 | Tilden | 137/527.8 |
| 3,060,962 | 10/1962 | Graves | 137/527.8 X |
| 3,074,429 | 1/1963 | Farrow | 137/531 X |

Primary Examiner—Robert G. Nilson
Attorney, Agent, or Firm—Woodard, Emhardt, Naughton, Moriarty & McNett

[57] ABSTRACT

A spill valve assembly is mounted to a flanged opening atop a liquid cargo tank of a barge. A valve disk normally closing an aperture in the assembly is maintained closed by a combination of pivoting lever arms. A self-centering post assembly atop the valve disk is held down by a valve retaining lever arm pivotally mounted on a horizontal axis horizontally spaced from the post assembly. When the pressure in the tank rises to the limit established by the valve setting, it moves the valve retaining lever arm sufficiently to tip a control lever arm connected to it and which moves in a way which facilitates further and more rapid pivoting of the retaining arm to thereby permit the spill valve to open freely and relieve the pressure in the tank. Balance weight adjustment means are provided to facilitate adjustment of spill setpoint pressures. A convenient field test of setpoint is provided.

16 Claims, 8 Drawing Sheets

COMPOUND LEVER CONTROLLED SPILL VALVE

BACKGROUND OF THE INVENTION

1. Field of the Invention

This invention relates generally to valves used on large containers of liquids, such as on the holds of river barges, for example, to enable contents of the container to be spilled from the top to avoid development of excessive pressure in the container at any time in general, and during filling operations in particular.

2. Description of the Prior Art

A commonly used approach to limiting internal pressure is to employ a valve which comprises a valve disk mounted on a guide post and which relies on its own weight to keep it sealed in a spill opening on the top of the cargo hold. Several problems are encountered with such an arrangement. For one thing, it is difficult to establish correctly, the internal pressure at which the valve will open. Also, it is difficult to assure adequate spill volume without attendant and excessive internal pressure increases. Also, variations in pressure limits may be encountered as a result of accumulation of dirt, ice or other foreign matter on the valve guide. Also, accumulations of snow or ice on the valve disk may increase its weight to the point where excessive internal pressure will be reached before the valve will open.

It is an object of the present invention to overcome one or more of the shortcomings of the prior art as described above.

SUMMARY OF THE INVENTION

Described briefly, according to a typical embodiment of the present invention, a spill valve disk normally closing an opening in the top of a liquid cargo hold is maintained in closed position by a combination of lever arms. A self-centering post assembly atop the valve is held down by a valve retaining lever arm pivotally mounted on a horizontal axis remote from the post assembly. When the pressure in the container rises to the limit established by the valve setting, it moves the valve retaining lever arm sufficiently to tip a control lever arm connected to it and which moves in a way which facilitates and assists in further and more rapid tilting of the retainer arm to thereby permit the spill valve to open freely and relieve the pressure in the cargo hold. Balance weight adjustment means are provided to facilitate adjustment of spill set point pressures.

DESCRIPTION OF THE PREFERRED EMBODIMENT

Figure 1:
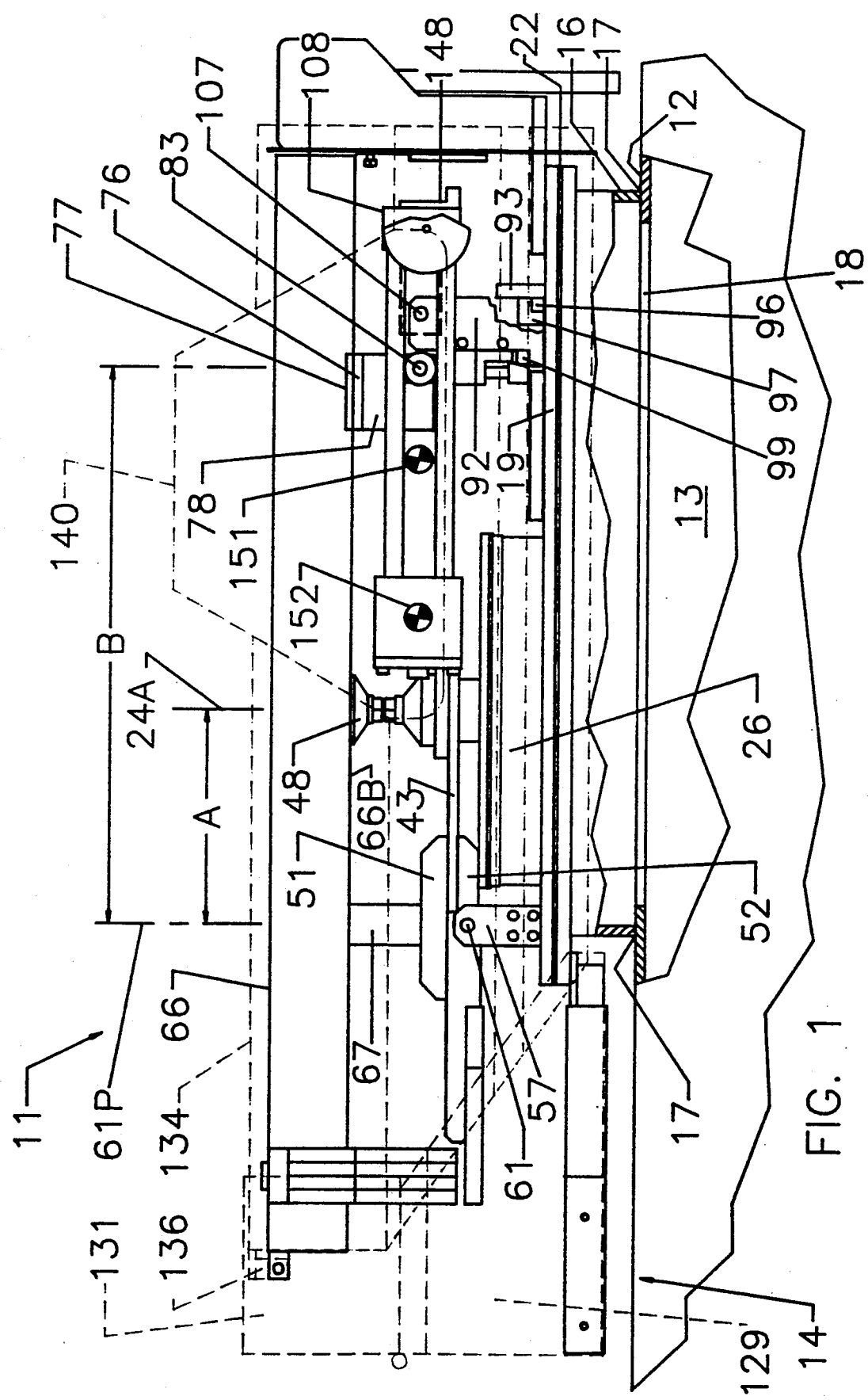
FIG. 1 is a side elevational view of a spill valve assembly according to the present invention, mounted on top of a cargo hold tank of a marine barge, shown fragmentarily, the outer covers of the valve assembly being shown in dotted lines, and the valve assembly being in the closed condition.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
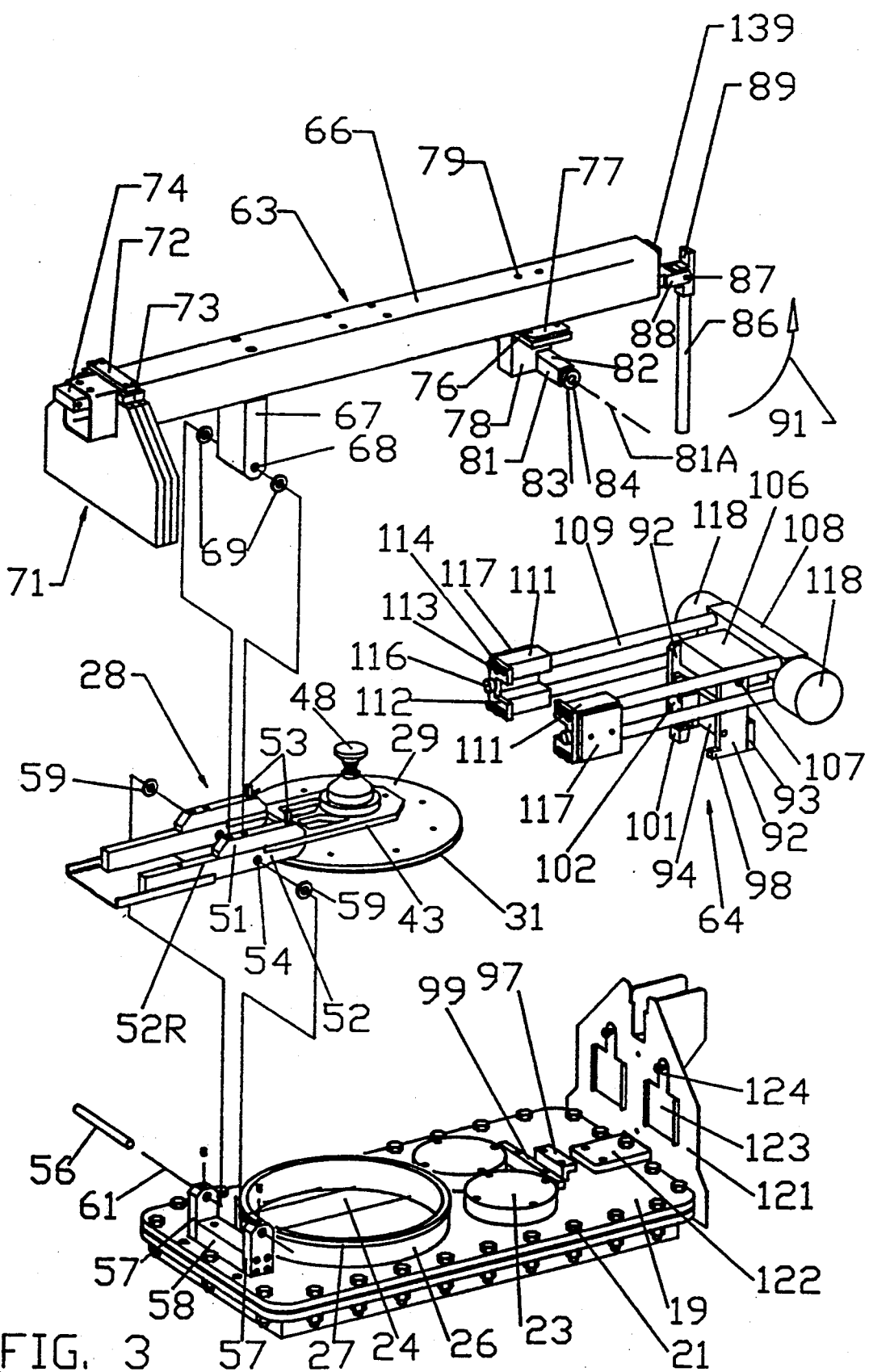
FIG. 3 is an exploded view showing component sub-assemblies of the valve assembly.

Referring now to FIG. 1, the valve assembly 11 is mounted to the top 12 of the liquid cargo holding tank 13 of a vessel 14 such as a barge. For that purpose, a mounting flange 16 is welded at 17 to the top of the tank around a rectangular cutout 18. The valve assembly of the present invention has a base 19 secured to the mounting flange by a series of bolts 21 (FIG. 3). A Teflon brand seal 22 is used between the base plate and the mounting flange.

The base plate has three holes in it, two small ones and one large one. The small ones are covered by caps 23, each secured to the base plate by four cap screws, with a gasket (not shown) between the caps and the base plate to provide suitable seal. Either or both of the small holes may be uncapped and used for installation of various accessories, one of them being a liquid level sensor (not shown) for example.

The large opening 24 (FIG. 3) is used to facilitate the spilling of the contents from the tank 13 when necessary to prevent overpressure conditions. It is surrounded by the pipe seal flange 26 welded to the base 19 and having a pipe seal 27 having a downwardly opening channel cross section (not shown) whereby the seal is fittingly received around on the top edge of the flange 26. This seal may be made of an EPDM material having a 65-70 durometer characteristic.

When the valve is closed as in FIG. 1, the pipe seal 27 receives the valve seal plate assembly 28 on top of it. This assembly includes the seal plate 29 having a seal plate gasket 31 secured to the bottom of it by a gasket retainer disk 32 (FIG. 2) secured to plate 29 by eight button head cap screws (not shown) inserted from the bottom of the retainer plate 32 and threadedly received in the seal plate 29.

Figure 5:
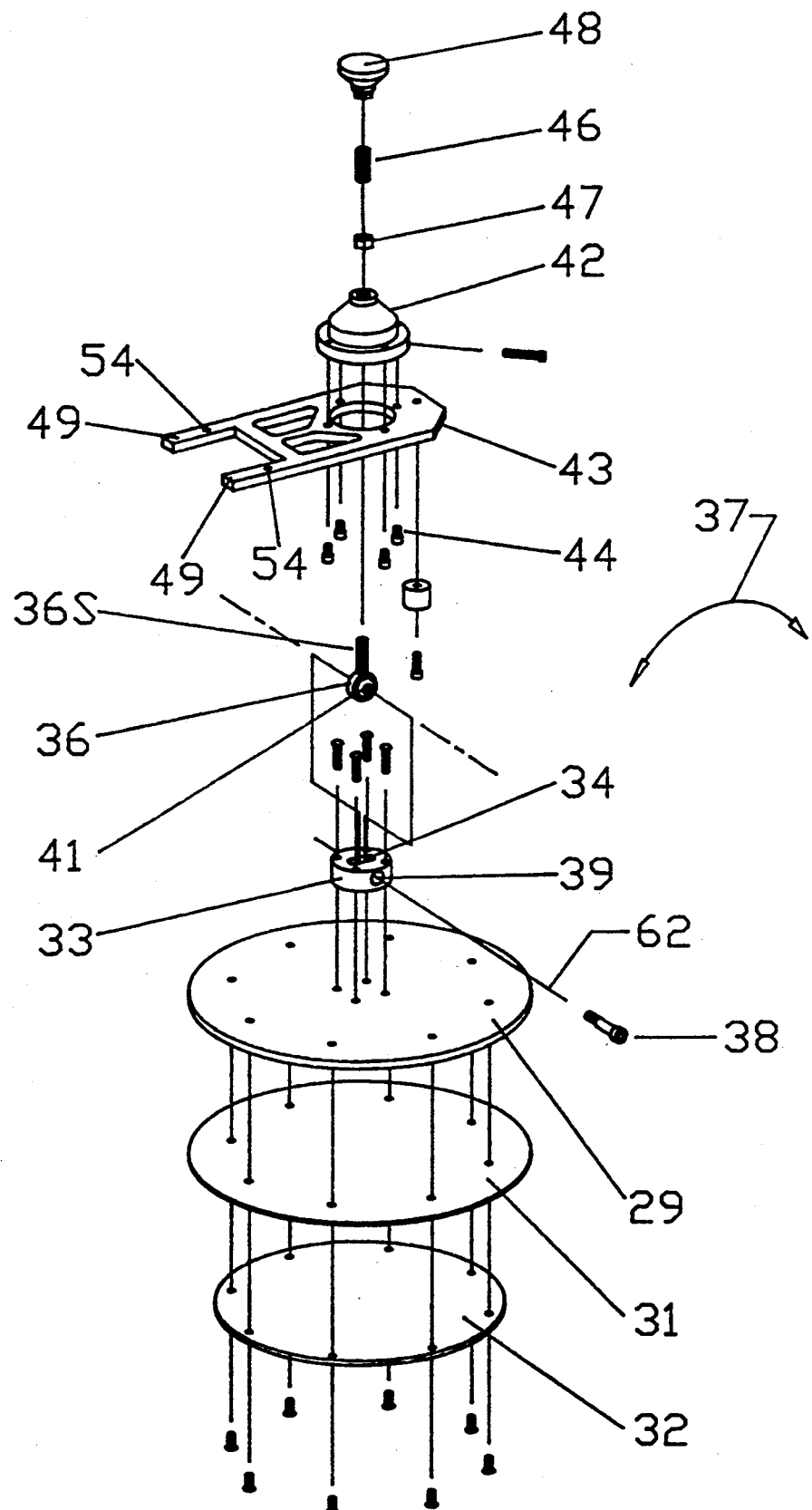
FIG. 5 is an exploded view of the seal plate assembly, except for the retainer rails.

A pivot housing 33 is fastened atop the seal plate by cap screws. As shown in FIG. 5, this housing has a vertical hole 34 through it and shaped to receive a rod end swivel unit 36 which can swivel in any direction due to its ball joint being fastened by a shoulder bolt 38 received through horizontal hole 39 and through the hole 41 in the rod end and threaded into the pivot housing 33 on the opposite side of the vertical hole 34. A swivel pad mount 42 is secured to the top of a seal plate arm 43 by four socket head cap screws 44 inserted from the bottom of the seal plate arm and threaded into the swivel base 42. The swivel base is internally threaded onto the threaded stem 36S of the rod end 36. A set screw 46 is screwed into the top of the swivel base 42 and its position locked by a nut 47 jammed against the top of the swivel base. The upper end of the set screw receives the swivel pad 48.

The seal plate arm has a pair of rearwardly extending fingers 49, each of which is received between the forward ends of upper and lower retainer rails 51 and 52, respectively (FIGS. 1-3), and secured in position by spring plunger pins 53 mounted in the upper retainer rails and receivable down through the holes 54 in seal plate arm 43 and seated in holes (not shown) in the lower retainer rails 52. These spring plunger pins can be pulled up and rotated 90 degrees to enable removal and installation of the fingers 49 in the slots between the forward end portions of the upper and lower retainers 51 and 52, respectively. The lower retainer rails have horizontal apertures 54 receiving a clamp arm shaft 56 through them and which is mounted in aligned apertures in the hinge side blocks 57 which are fastened to the hinge block 58 by cap screws, the hinge block 58 being fastened to the base 19 by cap screws. Washers 59 provide horizontal spacing between the retainer rails and the hinge side blocks 57 so that the seal plate arm and, thereby, the valve assembly 28 can pivot up and down about the horizontal axis 61 of the clamp arm shaft 56. Due to the self-aligning characteristics of the ball joint in the rod end 36 (FIG. 5) proper seating of the valve disk gasket 31 on the pipe seal 27 when the valve is closed, is assured. The rear end portions 52R of the lower retainer rails 52, extend rearward from the hinge axis 61 to partially counterbalance the weight of the components shown in FIG. 5. Consequently, there is only approximately a net fifteen pounds of weight of the seal plate assembly to keep it seated on the pipe seal 27. Indeed, control of the valve is largely achieved by the combination of the clamp arm assembly 63 and operator assembly 64 of FIG. 3.

First, referring to the clamp arm assembly 63, it includes the clamp arm tube 66 which has a clamp arm pivot post 67 fastened to it and which has a horizontal aperture 68 near its lower end and which is received on the clamp arm shaft 56. Spacer washers 69 provide clearance between the clamp arm pivot and the internal faces of the retainer rails 51 and 52. A counterweight pack 71, with three weights shown thereon, is mounted on the clamp arm 66 and supported thereon by a mounting bar 72, which is received over the top of the clamp arm and is fastened to the counterweight mounting blocks 73 which are located at each side of the clamp arm, whereby the counterweight pack can be located wherever desired longitudinally of the clamp arm. A cover hinge mount 74 is received partially inside the clamp arm tube 66 and fastened to it by cap screws for convenient mounting of the exterior cover to be described.

A limit plate 76 is fastened to the bottom of the clamp arm and extends out to both sides of it an equal distance. A bumper stop such as 77 is mounted to the top of the limit plate at each side of the clamp arm. A bearing axle mounting block 78 is fastened to the bottom of the limit plate 76, both the block 78 and the limit plate on top of it being fastened to the clamp arm by buttonhead cap screws 79 received through the top of the clamp arm and threaded into the block 78. A bearing axle 81 is received in a recess in the lower front end of the mounting block 78 fastened to it by a single shoulder bolt received in the front center of it in the direction of arrow 82 (FIG. 3), the axle extending out to both sides from the mounting block 78. A pair of roller bearings 83 is provided at each end of the axle block 81, being fastened thereto by a shoulder bolt 84 received through the inner race of each bearing of the pair at each end of the axle 81.

Figure 4:
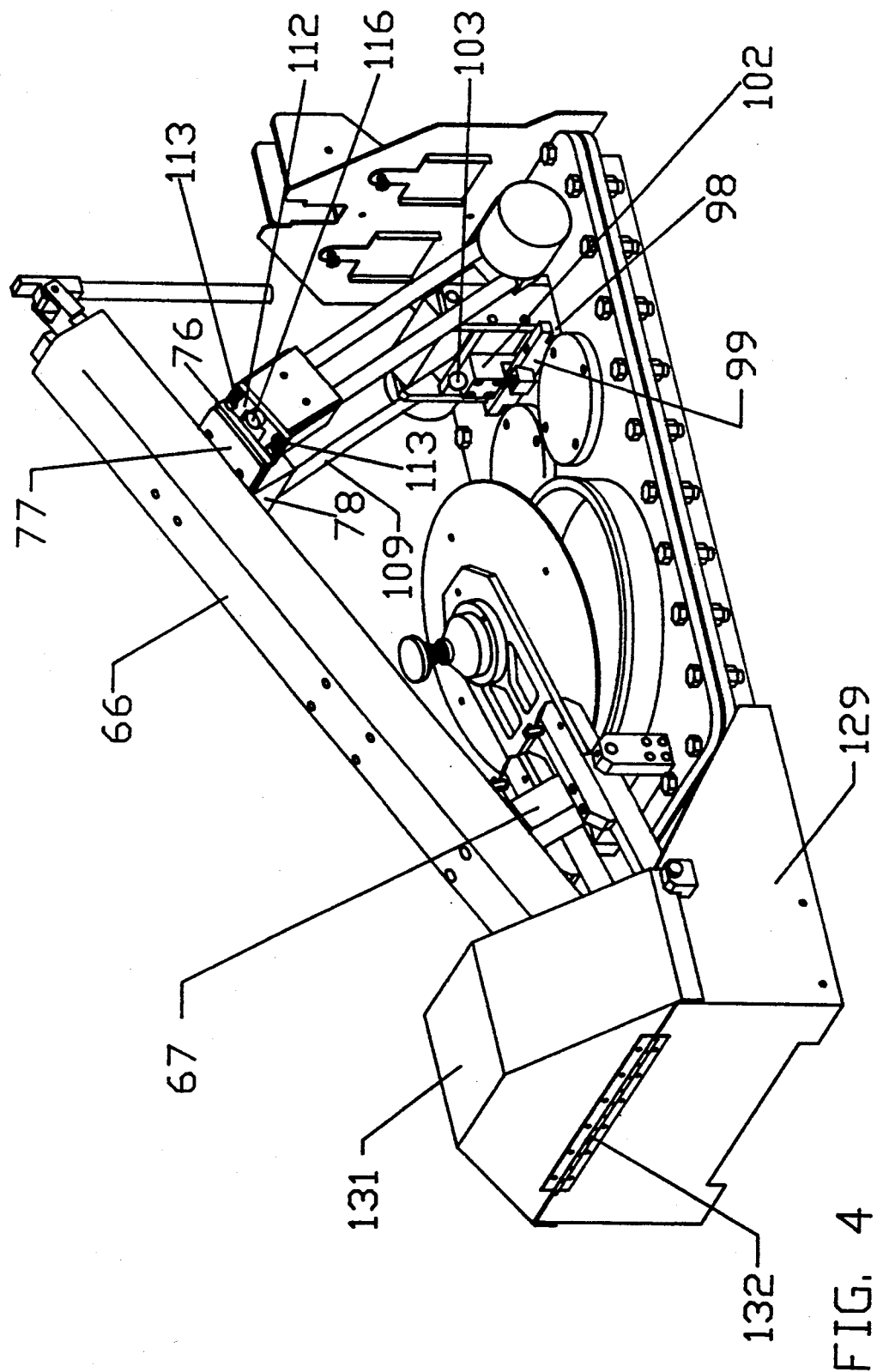
FIG. 4 is a pictorial view of the valve assembly latched open as for inspection.

A lifting handle 86 is provided at the front end of the clamp arm, being mounted on a pin 87 received in a mounting block 88 fixed inside the front end of the clamp arm tube 66. The upper end tab 89 of this handle 86 is so situated with respect to the top surface of the mounting block 88 that, when the handle 86 is pulled forward in the direction of arrow 91, the tab 89 will engage the top of the block 88 and facilitate lifting the clamp arm to a position such as shown in FIG. 4 for inspection and/or servicing the assembly, when desired.

Referring now to the operator assembly 64, it includes left and right side supports 92 fastened to a rear cross brace 94 by cap screws and to a front cross brace 93, also by cap screws. A toe rail 96 (FIG. 1) is fastened to the center portion of the rear face of front brace 93 and is received under the inverted L-shaped hook 97 which is fastened to the top of base plate 19. Each of the side supports 92 has a rearwardly extending toe 98 received under the notched outer end of a clamp bar 99 fastened to the base 19. A wedge block 101 (FIG. 3) is mounted at the lower end of a vertical shaft slidably received in the latching wedge mount 102 fixed to the rear face of rear brace 94. This wedge block is spring loaded downward to hold the toes 98 under the bar 99 and the rail 96 under the hook 97, thereby securing the operator assembly to the base 19. The wedge can be pulled up by a knob 103 on the top of the wedge shaft whereupon the operator assembly can be moved slightly forward to release the toes from capture under the respective hook 97 and clamp bar 99 to lift the operator assembly away from the base, if and when desired.

Further referring to the operator assembly, there is a center block 106 received between the side supports 92 and spaced therefrom by washers (not shown) like washers 59 and 69, the center block having a horizontally extending aperture therethrough with a suitable bushing therein (not shown) received on the pivot shaft 107 whereby the block 106 can pivot about the horizontal axis of shaft 107 and which is parallel to the clamp arm shaft 56. There is a rod support block 108 fastened to the front face of the center block 106 by cap screws. This rod support block has four rearwardly extending bearing rods 109 received in sockets therein and secured by cap screws installed from the front of the support block 108. Each of these rods has a weight block 111 fastened to the rear end thereof, the weight block having a forwardly opening socket receiving the rear end of the respective rod therein. The weight block 111 is affixed to the rod by a socket head cap screw (not shown) received through the rear end of the weight block. Each of these weight blocks has a slide plate 112 mounted thereon by four shoulder bolts 113, two at the bottom and two at the top. These shoulder bolts are received in horizontally extending slots 114 in the latch plates whereby the latch plates can be moved in toward the clamp arm or out away from the clamp arm to a limited extent determined by the spacing of the bolts and the length of the slots. A spring loaded plunger pin with knob 116 is mounted to each of the latching plates and can be pulled rearward to facilitate moving the latching plate and locking it either in toward the clamp arm or out away from the clamp arm. Set point establishing weights 117 are fastened to the outside faces of each of the weight blocks 111 by cap screws. Rod counterbalance weights 118 are mounted to the outside faces of the rod support block 108. This entire rod and weight assembly is pivotable about the horizontal axis of shaft 107. However, as shown in FIG. 1, the roller bearings 83 on the axle 81 are fittingly received between the upper and lower rods of the operator assembly on the near side, and the same arrangement is provided on the far side of the bearing axle block 78, these limiting the extent of pivoting of the operator assembly.

Referring further to FIG. 3, there is a front cover plate 121 which is fastened to a pad 122 which is fastened to the base 19. There are two doors 123 mounted to the front cover 121 and covering openings in the cover, each door being suspended from a screw passing through the cover 121 and secured by a self-locking nut 124. Thereby, the doors can be swung sidewards to uncover their respective openings in the front cover 121.

Figure 2:
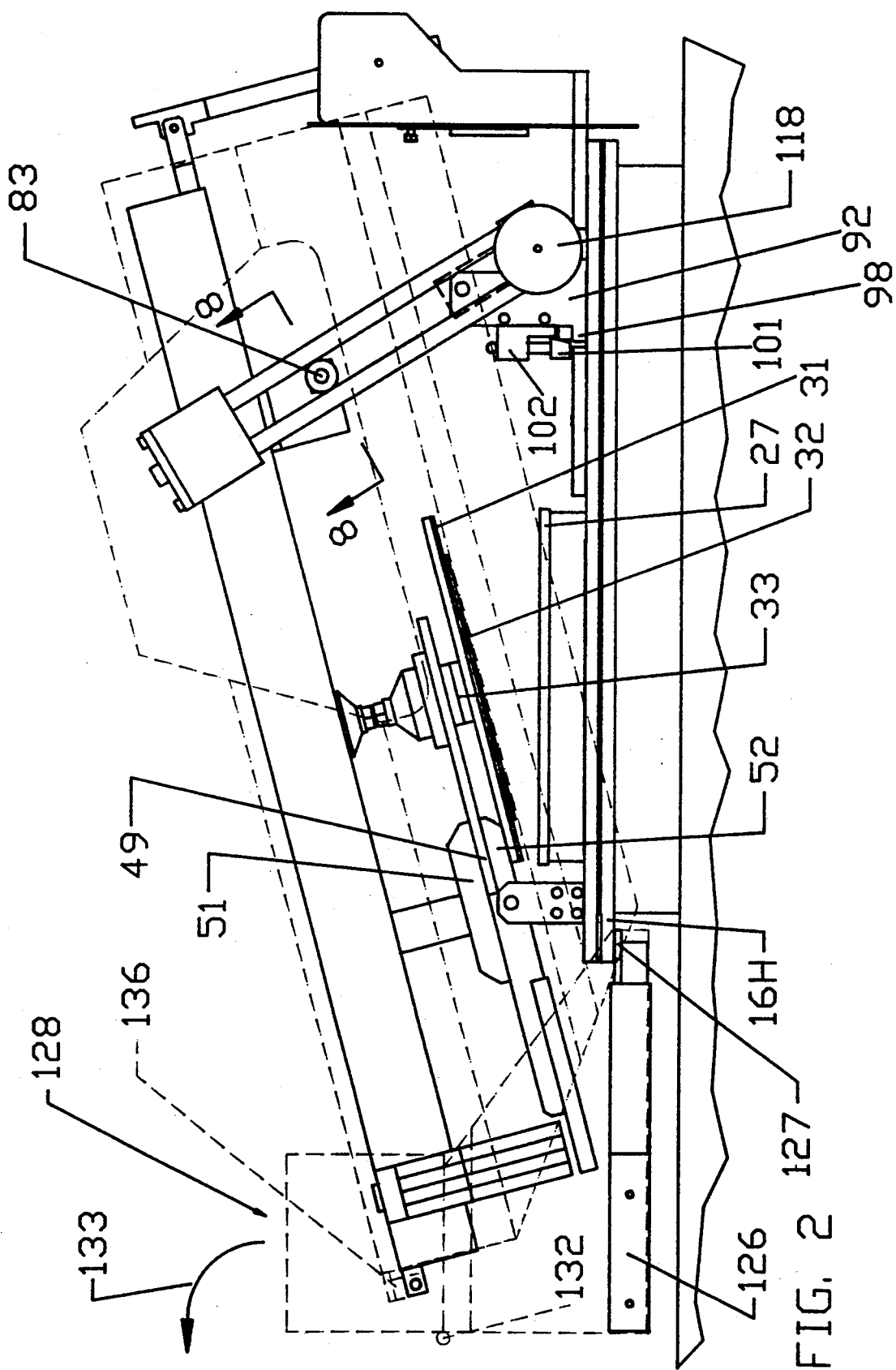
FIG. 2 is a view like FIG. 1 but showing the valve open after it has been forced open by a sudden rise of pressure inside the tank.

As shown in FIGS. 1 and 2, there is a rear cover mounting frame having its front end 127 affixed to the bottom of the out-turned flange portion 16H of the deck mounting flange 16. This supports the rear cover assembly 128. This includes the lower and stationary rear cover 129 and the upper rear cover 131 which is hinged to it at piano hinge 132 (FIGS. 1, 2 and 4) whereby the top rear cover 131 can be swung back in the direction of arrow 133 (FIG. 2) if desired. To do this, the knob 130 (FIG. 6) of a spring plunger pin mounted in block 135 fastened to cover 129 at each side, is pulled outward to free the pins from retaining holes (not shown) in the sides of the cover 13 near its front edges, so the front of cover 131 can be pulled up and back.

Figure 6:
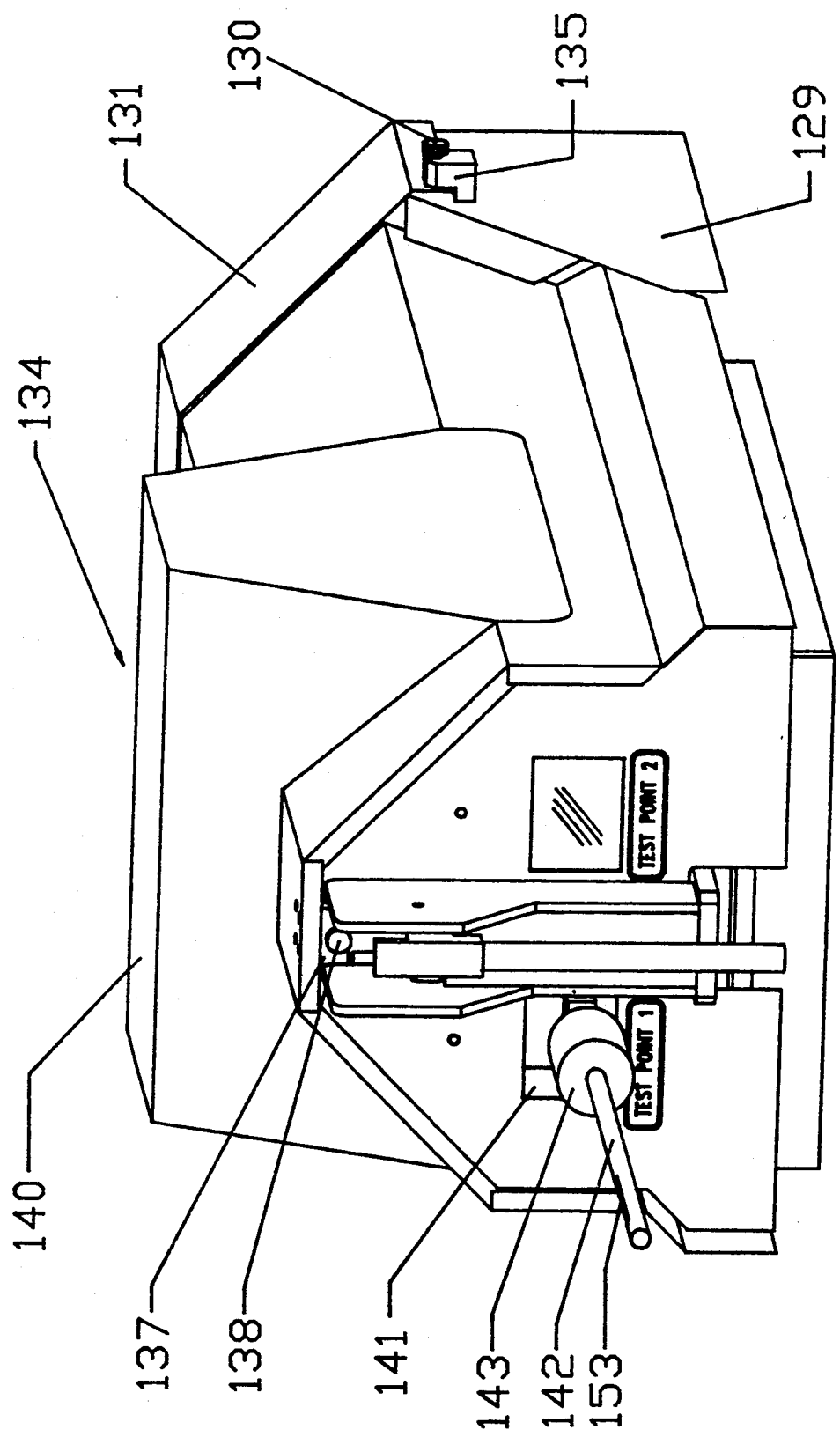
FIG. 6 is a front pictorial view of the valve assembly with the covers on it.

There is also a top cover assembly 134 shown in dotted lines in FIGS. 1 and 2, and in solid lines in FIG. 6. It has a yoke 136 at the rear end received around the mount 74 (FIG. 1) on the rear end of the clamp arm and to which yoke 136 is pinned to retain the top cover flat on top of the clamp arm. The front end of the top cover has a latch block 137 (FIG. 6) secured to the underside thereof and which has a spring loaded plunger pin therein with a knob 138 on its front end. This plunger pin is received under the pin block 139 fastened in the front end of the clamp arm tube 66 (FIG. 1) whereby the front end of the cover is retained in place on top of the clamp arm. The upwardly projecting and transversely extending housing portion 140 of the top cover provides room for the pivoting action of the operator assembly which occurs during release of the valve.

OPERATION

Referring now to FIG. 1, the valve is closed, with the seal plate gasket 31 seated on top of the pipe seal 27, thus closing the opening 24. The ability of the pivot housing 33 to swivel on the ball socket of the rod end enables the gasket 31 to rest flat on top of the pipe seal 27, thus sealing the opening 24 communicating with the interior of the tank 13. At the same time, the top of the swivel pad 48 is flat against the bottom 66B of the clamp arm 66. Because this is a swivel pad (Vlier SSP306D, for example), it is self-aligning under the clamp arm 66 so that the clamp arm can apply force directly down the central axis of the seal plate and seal plate gasket centered in the opening 24. At the same time, the upper rods 109 of the operator assembly 64 at each side of the clamp arm are applying downward force on the bearing assemblies 83 at each end of the axle 81. This downward force is applied as a result of the weights 111 and setting weights 117 at the rear ends of the rods applying a moment about the axis of pivot pin 107, which moment is counterclockwise as viewed in FIG. 1. The amount of weight providing the counterclockwise moment is determined by the valve size, desired setpoint tank pressure at which the valve is to open, and the various moment arms of the levers. For example, if the area of the opening 24 is 113 square inches, and the setpoint pressure is one pound per square inch, it will take 98 pounds of force downward through the swivel pad 48 to keep the valve closed, assuming that the weight of the valve assembly about the pivot axis 61 is fifteen pounds. As an example, the ratio of the lever arm distance "B" between the axle axis 81A and plane 61P containing the clamp arm pivot axis 61, to the lever arm distance "A" between the valve center axis 24A and plane 61P is 2.6, and the ratio of the lever arm distance between the pivot pin axis 107 and the center of gravity 151 of the operator arm assembly to the lever arm distance between the operator pivot pin axis 107 and the rollers 83 is approximately 2.7. Since the center of gravity 152 of the weights being added or subtracted by plates 117 is located farther from the pivot axis 107 than the center of gravity 151, the influence of weight removed or added at plates 117 is much greater so that, due to the moment arms of the levers employed, the force increase or decrease applied by changing weight by means of plates 117 is multiplied 14.8 times at the valve to change setpoint pressure.

Therefore, where the combination of weights of the movable elements on the operator arm assembly provides an effective downward force of 113 pounds on a 113 square inch area of opening 24, it will hold one pound per square inch of pressure inside the tank 13. Due to the compound lever arrangement, it will require addition of only 7.64 pounds of weight plates 117 to increase the force on the valve to 226 pounds to hold an internal pressure of two pounds per square inch.

In the operation, if the filling is too rapid, such that the internal pressure exceeds the setpoint, the pressure will force the valve off its seat. As it does so, the rollers 83 will lift the respective control rods to begin pivoting the control rod assembly clockwise about the pivot pin 107 as the clamp arm pivots counterclockwise about the clamp arm shaft 56 axis 61. As the pivoting action continues, product is spilled out of the opening to immediately relieve some pressure, and will continue to be spilled as long as the filling operation or other activity which caused the overpressure condition, continues. As the valve opens, the lever arm of the rollers 83 against the bearing rods 109 is farther out with respect to the axis of their pivot pin 107, while the center of gravity 151 moves closer to the pivot axis 107 so that the force required to maintain the seal plate assembly open decreases dramatically as the valve opens. Therefore, material can continue to flow from the tank even as internal pressure decrease below setpoint pressure.

When the valve is closed and, if cargo tank pressure increases as the tank is being filled since the tank may be unvented, as soon as overfilling occurs, the tank pressure increases virtually instantly. The sudden rise in pressure to the setpoint opens the valve quickly to accommodate an outflow rate at least equal to the loading rate to the compartment being protected. After loading is terminated, the seal plate assembly will settle back onto the pipe seal and reseal vapor tight. As it does so, the control arms descend to assure re-establishment and maintenance of the vapor tight condition until the next time internal pressure increases above setpoint pressure.

In the normal operation of the valve assembly, the slide plates 112 are situated at their innermost location toward the clamp arm. They serve as a stop to the upward pivoting action of the clamp arm when the bumpers 77 on top of the limit plate strike on the underside of the inwardly projecting portions of the slide plates as the valve pops open.

Recognizing that it is desirable to periodically inspect the valve seal plate gasket 31 and the pipe seal 27, it is possible to lift the clamp arm to the position shown in FIG. 4 and rest it there. For this purpose, the slide plate position retaining plunger pins 116 are pulled rearward and the slide plates are pushed outward so that the clamp arm can be raised without the pads 77 abutting the bottom surfaces of the slide plates. Then the handle 86 is pulled forward and upward in the direction of arrow 91 in FIG. 3 to lift the clamp arm up to the position shown in FIG. 4 where the limit plate 76 is above the rear faces of the slide plates 112. Then the plungers 116 are pulled rearward and the slide plates pushed inward toward the clamp arm so that they extend under the limit plate 76 and will support the limit plate and thereby the clamp arm 66 in that position. Since the valve assembly is not fastened to the clamp arm, and since no product is flowing from the tank during inspection operations, the seal plate assembly will normally be resting on and covering the opening 24. However, because it is only being held down by its own weight when in this condition, it can be easily raised to any position from closed to fully open or to an intermediate position such as shown in FIG. 4 to facilitate inspection of the gasket and seal. The assembly can be returned to operating condition by again pulling the spring plunger pins 116 rearward and pushing the slide plates outward to allow the limit plate and thereby the clamp arm to descend whereupon the slide plates are again pushed inward to be disposed in their clamp arm limit stop condition. It should be mentioned that the bearing rollers 83 remain captured between the upper and lower rods at each side during all of these operations.

Figure 7:
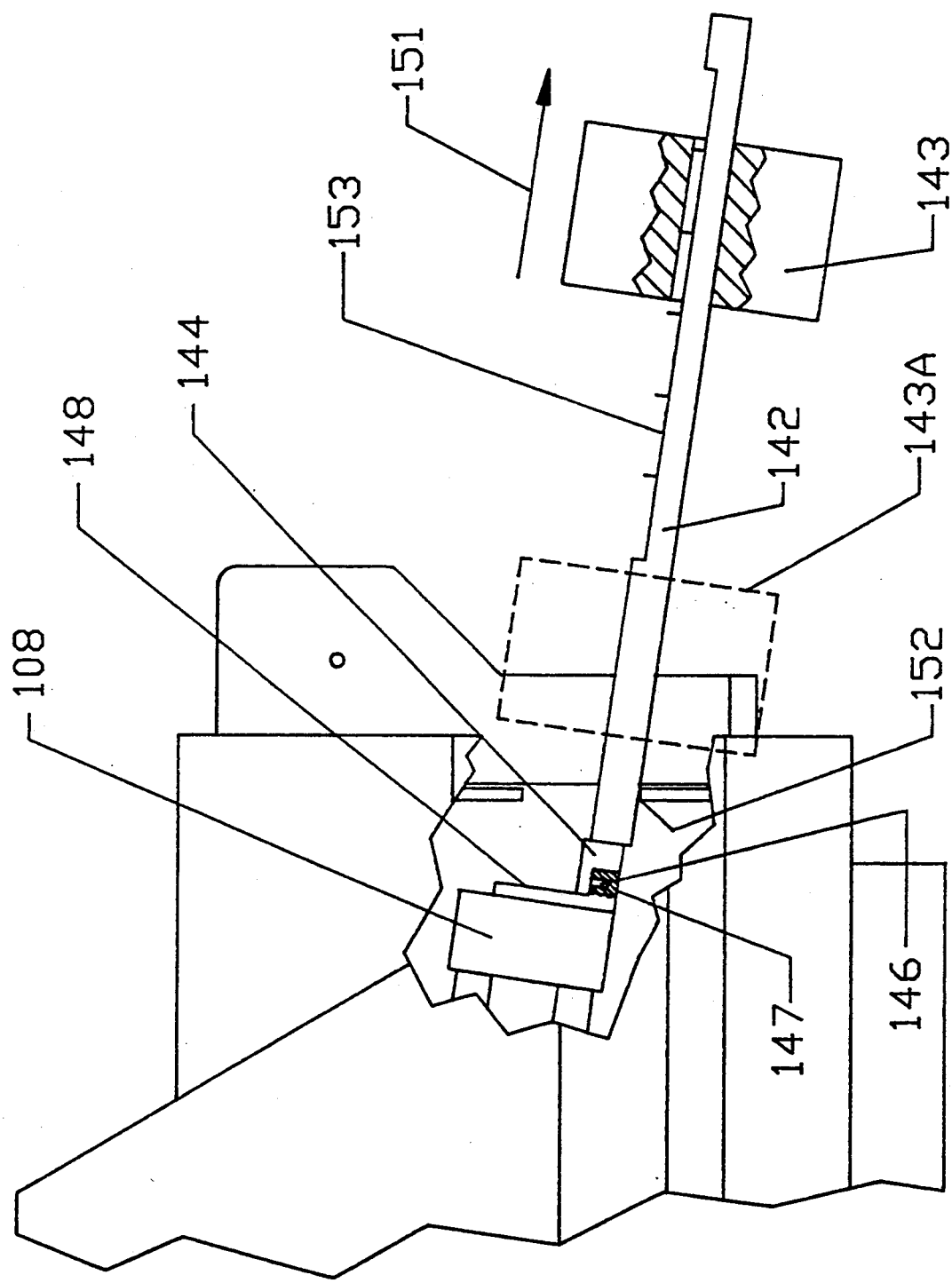
FIG. 7 is an enlarged fragmentary side elevational view showing the test rod placing the valve in the "opening condition."
Figure 8:
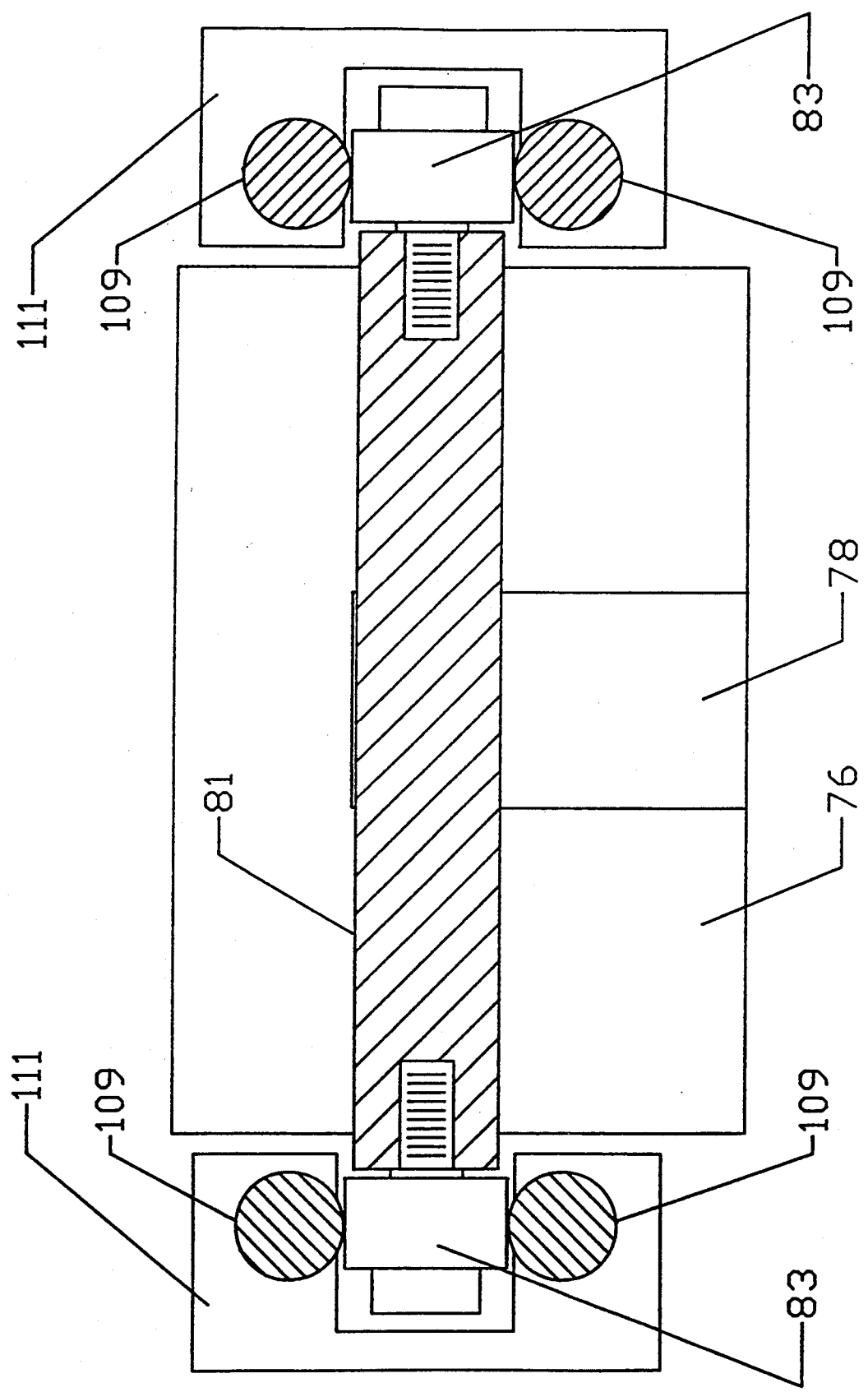
FIG. 8 is a fragmentary section taken at line 8—8 in FIG. 2 and viewed in the direction of the arrows.

For test purposes, FIG. 6 shows the opening 141 in the front panel from which the door 123 has been swung away to admit a test rod 142 with a test weight 143 thereon. The test rod has a test block 144 (FIG. 7) on the rear end thereof which has a downwardly projecting pin 146 received in a hole in the forwardly projecting ledge 147 of the test plate 148 fastened to the front face of the rod support 108. Accordingly, the rear end of the test rod is inserted through the opening 141 and is mounted on the ledge, and retained by the pin 146. The test weight 143 can be placed on the test rod near the rear end as shown n FIG. 6 and dotted at 143A in FIG. 3 with the valve in the closed condition. It is then moved forwardly in the direction of arrow 151 until the rod tips the operator downward and the rod touches the bottom edge 152 of the window opening. Then the location of the test weight 143 with respect to a scale 153 on the flatted portion of the top of the test rod indicates whether the valve is in the "opening condition" at the proper set point pressure or some percentage too low or some percentage too high from set point.

The valve assembly of the present invention should be mounted on the top of the individual cargo tank on the longitudinal center line of the barge or just to port or starboard of the center line. If normal loading of the various cargo tanks of a barge is performed one tank at a time from stern to bow, the spill valve should be located on the forward half of the cargo tank. Conversely, if the barge loading routine is bow to stern, the spill valve should be located on the aft half of the cargo tank. If loading is likely to occur from both ends of the barge, the spill valve should be located on the transverse center line of the cargo tank. The spill valve assembly can be oriented either longitudinally or transversely with reference to the barge.

In the foregoing description, the operation of various components has been described. Two of them can be considered levers. There are several classes of levers, depending on the location of the operating force, the fulcrum and the load to be handled. In the present example, the clamp assembly can be considered to function as a second class lever to hold the valve closed, and the control arm operator assembly can be considered to function as a second class lever as applied to hold the clamp arm in the valve closed holding state. Of course, levers of these classes can exist in a variety of shapes.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. On a liquid cargo tank of a marine vessel, and wherein there is an aperture in the top of the tank, with a mounting flange fastened and sealed to the tank around the aperture, a spill valve assembly comprising:
    a base plate fastened and sealed to the mounting flange and having an opening therein communicating with the interior of the tank,
    a spill valve which is seated around and closes the opening communicating with the interior of the tank;
    a valve clamp arm pivotally fastened to the base plate and holding the valve closed;
    a control arm assembly having a first position retaining the clamp arm in valve closed holding condition, and having a second position with the clamp arm in a valve open condition; and
    a counterweight normally retaining the control arm assembly in the first position but movable with movement of the control arm assembly to a position of less clamp arm retaining control to enable increasing movement of the spill valve from closed condition.

2. The assembly of claim 1 and wherein:
    the spill valve is responsive to pressure in the tank above a certain predetermined amount to begin to open and move to initiate movement of the clamp arm to initiate movement of the control arm assembly to begin to facilitate additional movement of the clamp arm and thereby facilitate additional opening movement of the spill valve.

3. On a liquid cargo tank of a marine vessel, and wherein there is an aperture in the top of the tank, with a mounting flange fastened and sealed to the tank around the aperture;
    a spill valve assembly comprising:
    a base plate fastened and sealed to the mounting flange and having an opening therein communicating with the interior of the tank;

a spill valve which is seated around and closes the opening communicating with the interior of the tank;

a valve clamp arm holding the valve closed;

a control arm assembly having a first position retaining the clamp arm in valve closed holding condition, and having a second position with the clamp arm in a valve open condition; and a counterweight normally retaining the control arm assembly in the first position but movable with movement of the control arm assembly to a position of less clamp arm retaining control to enable increasing movement of the spill valve from closed condition;

the clamp arm being pivotally fastened to the base plate and the control arm assembly being pivotally fastened to the base plate.

4. The combination of claim 3 and wherein:

the pivotal axis of the clamp arm and the pivotal axis of the control arm assembly are parallel.

5. The combination of claim 4 and wherein:

the spill valve includes a seal plate gasket sealed around the opening; and the the seal plate gasket is mounted to a valve mounting arm pivotally fastened to the base plate and pivotal about an axis parallel to the pivotal axis of the control arm assembly.

6. The combination of claim 5 wherein:

the pivotal axis of the valve mounting arm is the same as the pivotal axis of the clamp arm.

7. A spill valve assembly comprising:

a base connectable to a tank as a sealing closure for an overflow aperture for the tank;

a valve which closes an opening in the base and having a seal lying in a horizontal plane;

a valve clamp arm holding the valve closed;

a control arm assembly having a first position retaining the clamp arm in valve closed holding condition, and having a second position with the clamp arm in a valve open condition; and the control arm assembly in the first position being movable with movement of the valve in response to a predetermined set point pressure to a position of less clamp arm retaining control to enable increasing movement of the spill valve from closed condition.

8. A spill valve assembly comprising:

a base connectable to a tank as a sealing closure for an overflow aperture for the tank;

a valve which closes an opening in the base;

a valve clamp arm holding the valve closed;

a control arm assembly having a guide system and having a first position retaining the clamp arm in valve closed holding condition, and having a second position with the clamp arm in a valve open condition;

the control arm assembly in the first position being movable with movement of the valve in response to a predetermined set point pressure to a position of less clamp arm retaining control to enable increasing movement of the spill valve from closed condition; and a roller on the clamp arm and received on the guide system of the control arm assembly and operable as the spill valve opens to move along the guide system from a position providing greater resistance to valve opening to a position providing less resistance to valve opening.

9. The assembly of claim 8 and further comprising:

a test rod receiver on the control arm assembly for field testing of the valve-opening set point pressure.

10. The assembly of claim 8 and wherein:

the clamp arm and the control arm assembly and the valve are pivotally mounted to pivot on horizontal axes, and the control arm has counterweight adjustable in amount to determine the pressure at which the spill valve will open.

11. The assembly of claim 8 and wherein:

the spill valve includes a seal plate and a seal plate gasket fastened to the bottom of the seal plate and a seal plate arm which is pivotally mounted whereby the valve is pivotally mounted.

12. The combination of claim 11 and wherein:

the combined weight of the valve and the loading on it by the clamp arm are such as to cause the valve gasket to move the control arm assembly upon attainment of internal pressure in the tank of from 0.5 pounds per square inch to 3.5 pounds per square inch.

13. A method of holding pressure in a tank but relieving the pressure upon attainment of a predetermined maximum pressure in the tank and comprising the steps of:

maintaining tank closure by at least two cooperating arms, the first arm of the two holding a valve closed on the tank, and the second arm of the two holding the first arm in the valve closed holding condition;

placing the arms in a compound lever arrangement with loading points and pivot points arranged to multiply the force applied by the second arm to the first arm to produce the force applied by the first arm to the valve and thereby holding the valve closed with a much larger force than the force applied by the second arm to the first arm; and using movement of the valve from closed condition upon attainment of the predetermined pressure to reduce the closing force on the valve.

14. The method of claim 13 and wherein:

the using step further includes the step of changing the leverage of the the second arm relative to the first arm to facilitate further opening movement of the valve.

15. The method of claim 13, further comprising the step of:

applying the valve closed holding force through a second class lever.

16. The method of claim 15, further comprising the step of:

applying the force of the second arm to the first arm through a second class lever.

* * * * *